United States Patent
Patterson et al.

(10) Patent No.: US 12,530,671 B2
(45) Date of Patent: Jan. 20, 2026

(54) PROCESSING USING MACHINE READABLE CODES AND SECURE REMOTE INTERACTIONS

(71) Applicant: Visa International Service Association, San Francisco, CA (US)

(72) Inventors: Barbara Patterson, San Francisco, CA (US); Allen Cueli, San Francisco, CA (US); Ralph Koker, San Francisco, CA (US); Ruben Salazar Genovez, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/763,834

(22) PCT Filed: Oct. 16, 2020

(86) PCT No.: PCT/US2020/055988
§ 371 (c)(1),
(2) Date: Mar. 25, 2022

(87) PCT Pub. No.: WO2021/076891
PCT Pub. Date: Apr. 22, 2021

(65) Prior Publication Data
US 2022/0343314 A1 Oct. 27, 2022

Related U.S. Application Data

(60) Provisional application No. 62/923,063, filed on Oct. 18, 2019.

(51) Int. Cl.
*G06Q 20/32* (2012.01)
*G06Q 20/40* (2012.01)
*H04L 9/32* (2006.01)

(52) U.S. Cl.
CPC ..... *G06Q 20/3274* (2013.01); *G06Q 20/3226* (2013.01); *G06Q 20/401* (2013.01); *H04L 9/3213* (2013.01); *H04L 2209/56* (2013.01)

(58) Field of Classification Search
CPC .......... G06Q 20/3274; G06Q 20/3226; G06Q 20/401
See application file for complete search history.

(56) References Cited

U.S. PATENT DOCUMENTS

| 9,721,268 B2 * | 8/2017 | Bondesen | G06Q 20/36 |
| 10,318,955 B2 * | 6/2019 | Wilczynski | G06Q 20/36 |

(Continued)

FOREIGN PATENT DOCUMENTS

| CN | 105531733 A | 4/2016 |
| CN | 106233664 | 12/2016 |

(Continued)

OTHER PUBLICATIONS

PCT/US2020/055988, "International Search Report and Written Opinion", Feb. 9, 2021, 9 pages.

(Continued)

*Primary Examiner* — Edward Chang
*Assistant Examiner* — William D Newlon
(74) *Attorney, Agent, or Firm* — Kilpatrick Townsend & Stockton LLP

(57) ABSTRACT

A method is disclosed. The method includes receiving, by an application on a communication device from an access device, a unique identifier associated with a resource provider in a transaction. The method also includes transmitting, by the application, a message comprising the unique identifier and an access data reference identifier associated with access data to a remote server computer associated with the application. The remote server computer searches a database for access data using the access data reference (Continued)

identifier, retrieves the access data, and provides the access data to a transport computer which processes the transaction using the access data.

20 Claims, 9 Drawing Sheets

(56) References Cited

U.S. PATENT DOCUMENTS

| | | | |
|---|---|---|---|
| 10,445,736 B2* | 10/2019 | Kohli | G06Q 20/40 |
| 11,769,137 B2* | 9/2023 | Hernandez | G06Q 20/202 |
| | | | 705/39 |
| 2005/0246293 A1* | 11/2005 | Ong | G06Q 20/385 |
| | | | 705/70 |
| 2012/0074219 A1* | 3/2012 | Burdett | G06Q 20/3827 |
| | | | 235/380 |
| 2012/0197801 A1 | 8/2012 | Jimenez et al. | |
| 2012/0284130 A1 | 11/2012 | Lewis et al. | |
| 2014/0129435 A1* | 5/2014 | Pardo | G06Q 20/36 |
| | | | 705/41 |
| 2015/0294313 A1* | 10/2015 | Kamal | G06Q 20/322 |
| | | | 705/44 |
| 2015/0332291 A1 | 11/2015 | Gillooly et al. | |
| 2015/0339648 A1 | 11/2015 | Kushevsky et al. | |
| 2016/0267460 A1 | 9/2016 | Lamba | |
| 2017/0061427 A1* | 3/2017 | Sharma | G06Q 20/367 |
| 2017/0221054 A1* | 8/2017 | Flurscheim | G06Q 20/3276 |
| 2017/0373852 A1* | 12/2017 | Cassin | H04L 63/062 |
| 2018/0308117 A1* | 10/2018 | Gupta | G06Q 30/0226 |
| 2018/0330364 A1* | 11/2018 | Driscoll | G06Q 20/36 |
| 2019/0066096 A1* | 2/2019 | Wouters | G06Q 20/20 |
| 2019/0147515 A1* | 5/2019 | Hurley | G06Q 20/3821 |
| | | | 705/44 |
| 2019/0197527 A1* | 6/2019 | Agarwalla | G06Q 20/3676 |
| 2019/0273734 A1* | 9/2019 | Thakkar | H04L 9/088 |
| 2019/0362339 A1* | 11/2019 | Gurunathan | G06Q 20/3674 |
| 2020/0074442 A1* | 3/2020 | Kulkarni | G06Q 20/3276 |
| 2020/0175489 A1* | 6/2020 | Huang | G06Q 20/3278 |
| 2021/0065156 A1* | 3/2021 | Kadiwala | G06Q 20/363 |

FOREIGN PATENT DOCUMENTS

| | | |
|---|---|---|
| CN | 108604989 A | 9/2018 |
| CN | 110036386 A | 7/2019 |

OTHER PUBLICATIONS

EP20875990.2, "Extended European Search Report", Nov. 15, 2022, 8 pages.
Application No. CN202080072724.0, Office Action, Mailed on Feb. 27, 2025, 22 pages.
Application No. SG11202202923X, Written Opinion, Mailed on Mar. 13, 2025, 9 pages.
Application No. CN202080072724.0, Office Action, Mailed On Oct. 31, 2025, 22 pages.

* cited by examiner

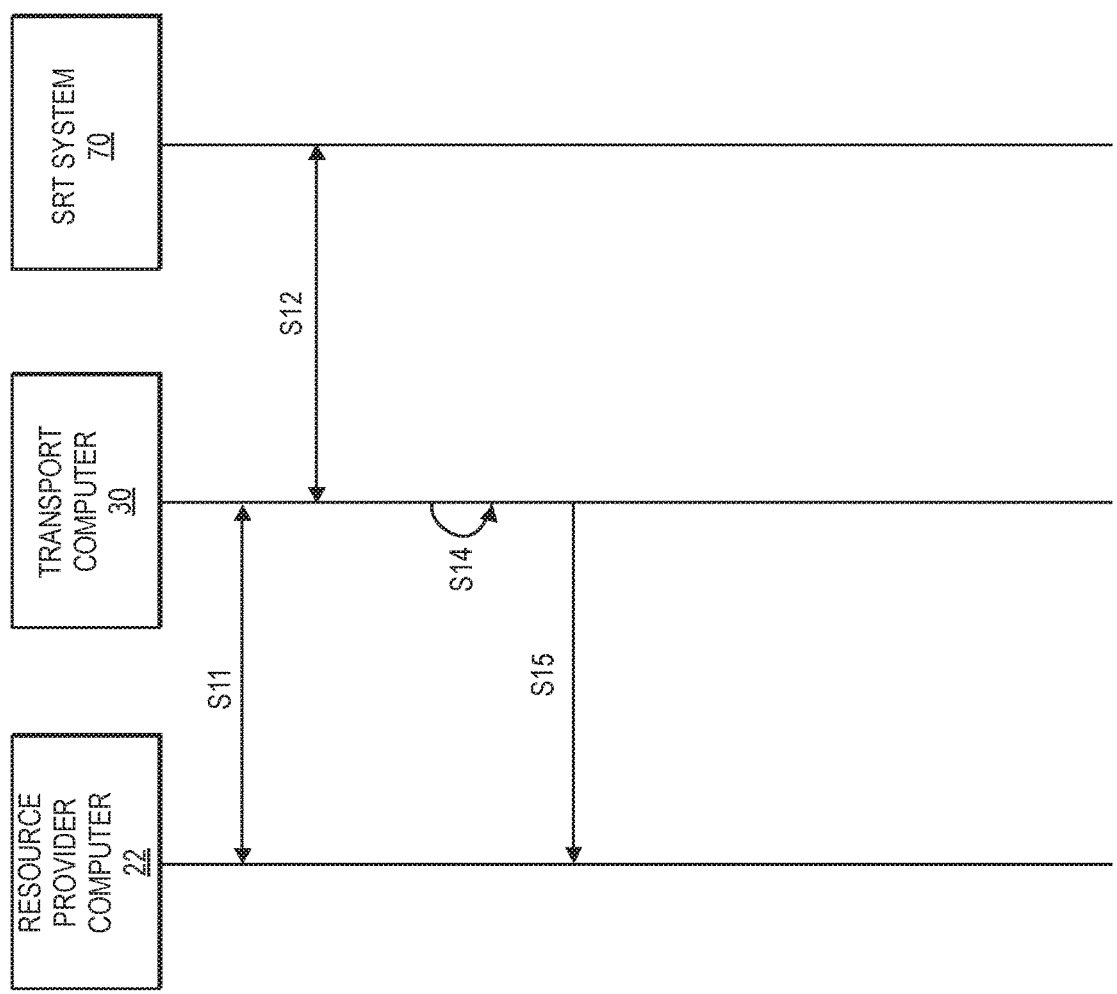

PROCESSING USING MACHINE READABLE CODES AND SECURE REMOTE INTERACTIONS

CROSS-REFERENCES TO RELATED APPLICATIONS

This application is a National Stage of International Application No. PCT/US2020/055988, filed Oct. 16, 2020, which claims priority to U.S. Provisional Application No. 62/923,063, filed on Oct. 18, 2019, which are herein incorporated by reference in their entirety.

BACKGROUND

Codes such as QR codes have been used to access resources such as secure data, goods and services, and secure locations. When they are used, access data that is stored in a communication device that has scanned a QR code can be provided to a server computer to access a desired resource.

While such systems are useful, there are a number of problems with such systems. For example, when access data is stored on a communication device it is susceptible to hacking and can be compromised. Also, a user of a communication device such as a mobile phone may wish to utilize specific access data with multiple applications on the user's phone. In this case, the user needs to interact with each application to manage the access data with respect to each application. This can be cumbersome and difficult, especially when the access data becomes inoperative (e.g., is expired or was compromised) and needs to be replaced. For example, a user may have ten applications on a communication device that might use the same access data to provide a user with a particular resource. At some time, the access data may expire and new access data needs to be provided to each of the ten applications. The user needs to input the new access data into each and every application.

Embodiments of the invention address these and other problems, individually and collectively.

SUMMARY

One embodiment of the disclosure includes a method comprising: receiving, by an application on a communication device from an access device, a unique identifier associated with a resource provider in a transaction; transmitting, by the application, a message comprising the unique identifier and an access data reference identifier associated with access data to a remote server computer associated with the application, wherein the remote server computer searches a database for access data using the access data reference identifier, retrieves the access data, and provides the access data to a transport computer which processes the transaction using the access data; and receiving a notification that the transaction is authorized.

Another embodiment of the disclosure includes a communication device comprising: a processor; and a computer readable medium, the computer readable medium comprising code, executable by the processor, to perform a method comprising: receiving, by an application from an access device, a unique identifier associated with a resource provider in a transaction; transmitting a message comprising the unique identifier and an access data reference identifier associated with access data to a remote server computer associated with the application, wherein the remote server computer searches a database for access data using the access data reference identifier, retrieves the access data, and provides the access data to a transport computer which processes the transaction using the access data; and receiving a notification that the transaction is authorized.

Another embodiment of the disclosure can include a method comprising: receiving, by a remote server computer, from an application on a communication device, a message comprising the unique identifier and an access data reference identifier associated with access data; searching a database for access data using the access data reference identifier; retrieving the access data; and providing the access data to a transport computer which processes the transaction using the access data.

These and other embodiments are described in further detail below.

BRIEF DESCRIPTION OF THE DRAWINGS

FIG. 2A shows a process for setting up an account and unique identifier for a resource provider according to the embodiments.

DETAILED DESCRIPTION

Figure 1:
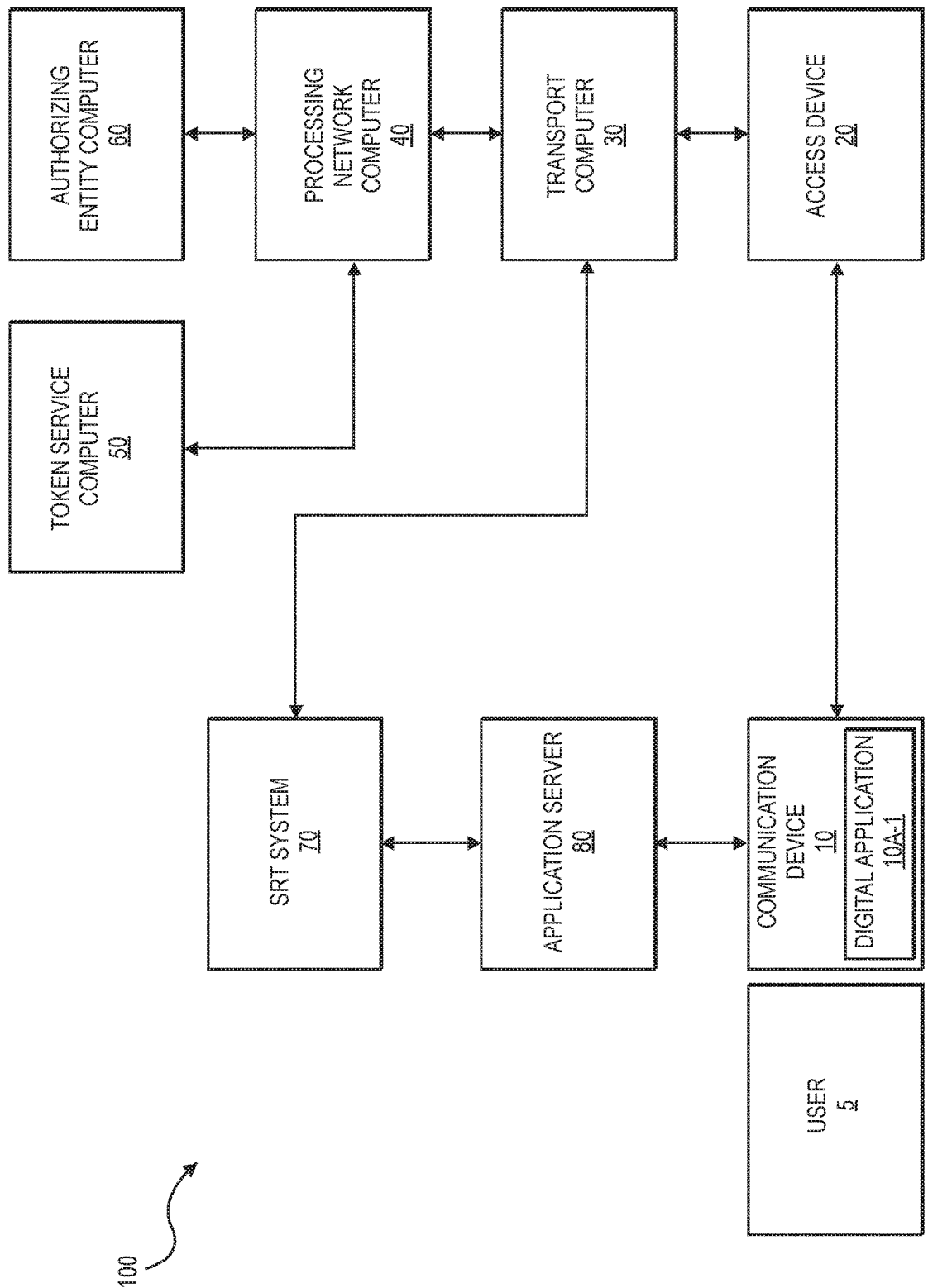
FIG. 1 shows a block diagram of a system according to an embodiment of the invention.

Prior to discussing embodiments of the invention, description of some terms may be helpful in understanding embodiments of the invention.

"Access data" may include any suitable data that can be used to access a resource or create data that can access a resource. In some embodiments, access data may be account information for a payment account. Account information may include a credential such as a PAN (primary account number), an access token such as a payment token, expiration date, verification values (e.g., CVV, CVV2, dCVV, dCVV2), etc. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access data reference identifier" can be an identifier that is associated with access data, but is not the access data itself. The access data reference identifier can have any suitable number of types of characters. Also, the access data reference identifier may be derived from the access data itself (e.g., a hash of the access data), or it may be generated or selected independently of the access data.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a mobile device. In some embodiments, an access device may be a POS terminal and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "electronic wallet" or "digital wallet" can include software that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

"Account credentials" may include any suitable information associated with an account (e.g. an account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

A "token" may be a substitute value for a credential. A token may be a string of numbers, letters, or any other suitable characters. Examples of tokens include access tokens, personal identification tokens, etc. A token may include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN or other account identifier from the token value may not be computationally derived.

"Tokenization" is a process by which data is replaced with substitute data. For example, an account identifier (e.g., a primary account number (PAN)) may be tokenized by replacing the primary account identifier with a substitute number (e.g. a token) that may be associated with the account identifier.

A "token provider computer" or "token service system" can include one or more computers that service tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN and conducting a transaction using that PAN. In some embodiments, a token service system may include a tokenization computer alone, or in combination with other computers such as a transaction processing network computer. Various entities of a tokenization ecosystem may assume the roles of the token provider. For example, processing networks and issuers or their agents may become the token provider by implementing the token services according to embodiments of the present invention.

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a user using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be an electronic message reply to an authorization request message generated by an issuing financial institution (i.e. issuer) or a payment processing network. An authorization response message according to some embodiments may comply with ISO 8583, which is a standard for systems that exchange electronic transaction information associated with a payment made by a user using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. In one example, a server computer may be a database server coupled to a Web server.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "transaction processing network," or "processing network," may include a network that can process transactions. In some embodiments, a "processing network" can include an electronic payment system used to accept, transmit, or process transactions made by payment devices for money, goods, or services. The processing network may perform authorizing, clearing and settlement of transactions involving authorization entities (e.g., issuers), acquirers, merchants, and payment device users.

A "communication device" may comprise any suitable electronic device that may be operated by a user, which may also provide remote communication capabilities to a network.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component. In other embodiments, a "user device" may be a payment device such as credit, debit, or stored value card.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

In embodiments of the invention, a user can activate a digital application such as an access application (e.g., a digital wallet application) on a communication device. Activation of the digital application can invoke a "scan QR" feature in the digital application. The "scan OR" feature of the digital application can activate a camera in the communication device. The communication device can then scan a QR code that is displayed on an access device. In some embodiments, the access device may be a POS terminal at a resource provider such as a merchant, an access terminal at a secure location, etc. The QR code on the access device may encode data such as a unique identifier associated with the resource provider, a name associated with the resource provider, an amount or value associated with the transaction, a timestamp, etc.

After scanning the OR code, the digital application on the communication device may present indicators (e.g., images) of one or more user devices (e.g., cards) that are associated with one or more access data reference identifiers. The access data reference identifiers may be stored in the communication device or may be automatically retrieved from an SRT system comprising a remote server computer.

Once the indicators of the user devices are displayed on the screen of the communication device, the user may select one of the user devices to use to conduct the current transaction with the resource provider. If the digital application is a digital wallet or digital payment application, the digital application can also display the name of the resource provider (e.g., a merchant name), a location of the resource provider (e.g., a merchant city), and any other data associated with the transaction (e.g., a transaction currency) to the user. In some cases, the digital application can also prompt the user to enter or confirm a transaction amount in addition to selecting a user device to confirm the transaction.

After the digital application on the communication device receives the confirmation from the user that the transaction is to proceed, the communication device can retrieve an access data reference identifier associated with the selected user device and then provide it to a server computer in an SRT (secure remote transaction) system. The SRT system then searches a database for the access data corresponding to the received access data reference identifier, and then retrieves the corresponding access data from the database. For example, the access device reference identifier may be a string of characters such as X182ciw21#, which may correspond to access data such as a payment token, which may be a sixteen digit number that represents a real credential, but is not a real credential such as a PAN.

The digital application then sends a message to the SRT system via a dedicated API. The message may include the access data reference identifier, the SRT unique identifier associated with the resource provider, and the amount. The SRT system can then validate that the resource provider is registered by checking that the SRT unique identifier is stored in a database and is associated with the resource provider conducting the transaction.

If the resource provider is validated, then the SRT system retrieves transport computer (e.g., acquirer computer) details (e.g., a URL of the acquire computer) from its registration database, and generates an SRT correlation identifier or SRT correlation ID. Once the SRT correlation ID is generated, the SRT system can send a notification with the correlation ID to the transport computer via dedicated payment URL. The SRT system can also prepare a payload including the access data associated with the access data reference identifier.

In some embodiments, the access data in the payload may comprise a token that corresponds to the access data reference identifier, a token expiration date, and a cryptogram. The cryptogram may be a cryptographic string that validates that the token is being used in a proper transaction channel. For example, one token associated with a real credential may be used in an online transaction, while another token may be used in an in-person transaction channel. Each token would have a different cryptogram associated with it, but all of the tokens and cryptograms would be associated with the same underlying real credential (e.g., a real primary account number or PAN).

After receiving the notification from the SRT system, the transport computer then sends message including the correlation ID to the SRT system via an API to retrieve the generated payload data. The SRT system then sends a payload data response with the payload and optionally the correlation ID to the transport computer.

After the payload is received by the transport computer, the transport computer then incorporates the payload data into an authorization request message, and sends the authorization request message to a processing network computer. The processing network computer may be a payment processing network computer in some embodiments. The authorization request message can include at least the token, the cryptogram, and the amount associated with the transaction. The processing network computer can communicate with a token provider computer to validate the cryptogram to ensure that the token is being used in a correct transaction channel (e.g., a QR code transaction channel). In some embodiments, cryptograms and their corresponding channels may be stored by the token provider computer. The processing network computer may also communicate with a token provider computer to obtain a real credential associated with the token. After the real credential is obtained by the processing network computer, the processing network computer may transmit a modified authorization request message with the real credential to an authorizing entity computer for authorization.

After receiving the authorization request message, the authorizing entity computer may then generate an authorization response message which may include an approval or decline. The authorizing entity computer can transmit the authorization response message including the real credential to the processing network computer, which then retrieves the token from the token provider computer and generates a modified authorization response message. The modified authorization response message is then sent to the transport computer. The processing network computer or the transport computer may then send notifications indicating that the transaction is authorized to the SRT system, the access device, and/or the communication device.

At the end of the day or at any other suitable period of time, a clearing and settlement process can occur between the transport computer, the processing network computer, and the authorizing entity computer.

FIG. 1 shows a block diagram of a system 100 according to an embodiment of the invention. The system 100 includes a user 5 which may operate a communication device 10 comprising a digital application 10A-1. The digital application 10A-1 on the communication device 10 may communicate with an application server 80. The application server 80 may communicate with an SRT system 70, which may operate a remote server computer. Although one application server and one digital application are illustrated in FIG. 1, there may be many application servers and many digital applications on many different communication devices which may communicate with the SRT system 70.

The communication device 10 may also communicate with an access device 20. In some embodiments, the access device 20 may be a terminal that can communicate with the communication device 10 using a short range communication process such as NFC, Bluetooth, or image capture. The access device 20 may in turn communicate with an authorizing entity computer 60 via a transport computer 30 and a processing network computer 40. The processing network computer 40 may be in communication with a token service computer 50, and the SRT system 70 may be in communication with the transport computer 30.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

FIG. 2A depicts the set up and enablement flow for a resource provider (e.g., a merchant) to establish a unique identifier with an operator of a transport computer (e.g., an acquirer).

In step S11, a resource provider (e.g., a merchant), operating a resource provider computer 22, and one or more access devices (not shown) coupled to the resource provider computer 22, communicates (e.g., forms an agreement) with an operator of a transport computer 30, which may be operated by an acquirer/gateway (or PSP provider), to accept payments through a secure remote transaction (SRT) system. The transport computer 30 establishes a notification URL for SRT transactions using an onboarding API.

In step S12, the operator of the transport computer 30 registers the resource provider operating the resource provider computer 20 and the one or more access devices with the SRT system 70. The SRT system 70 stores registration data (e.g., a network address, a name, etc.) associated with the resource provider in a database in the SRT system 70 along with details (e.g., a network address, a name, etc.) regarding the entity operating the transport computer 30. The transport computer 30 and/or the SRT system 70 prepares a unique identifier associated with the resource provider computer 20. This unique identifier may then be incorporated into data representing a machine readable code (e.g., a two-dimensional code such as a OR code). The machine readable code is subsequently presented to a user by an access device of the resource provider in a transaction. The unique identifier can both identify the resource provider and be used in a validation process to ensure that the resource provider had previously agreed to use the SRT system 70. In some cases, the unique identifier may also include data that is signed by a cryptographic key such as a private key of the SRT system or the transport computer, of a public private key pair. During a subsequent unique identifier validation process, a public key of the public-private key pair may be used to validate the signed data and confirm that the resource provider previously registered with the SRT system 70.

In some embodiments, the SRT system 70 may generate a dynamic authentication ID, which may be sent to the transport computer 30 to be encoded into the unique identifier and/or the QR code associated with the resource provider computer 20. The dynamic authentication ID may be used as an additional assurance mechanism when the SRT later validates the unique identifier during a transaction.

In step S14, if the SRT system 70 did not generate the unique identifier, the transport computer 30 can generate the SRT unique identifier. The transport computer 30 may also generate data representing a machine readable code such as a QR code that includes the SRT unique identifier. In some embodiments, the SRT unique identifier may encode information used to initiate an SRT transaction, including a resource provider identifier and the dynamic authentication ID.

In step S15, the SRT unique identifier and data representing the machine readable code are provided to the resource provider computer 20 by the transport computer 30. The resource provider computer 20 can also provide the SRT unique identifier and/or the data representing the machine readable code to one or more access devices operated by the resource provider operating the resource provider computer 20. The one or more access devices may display the machine readable code to users when conducting transactions.

The resource provider computer 20 can also receive a reconciliation application from the transport computer 30. The reconciliation application may confirm and reconcile all transactions performed using the SRT unique identifier. The application updates the resource provider operating the resource provider computer 20 in real-time as to the state of any SRT transactions.

Figure 2B:
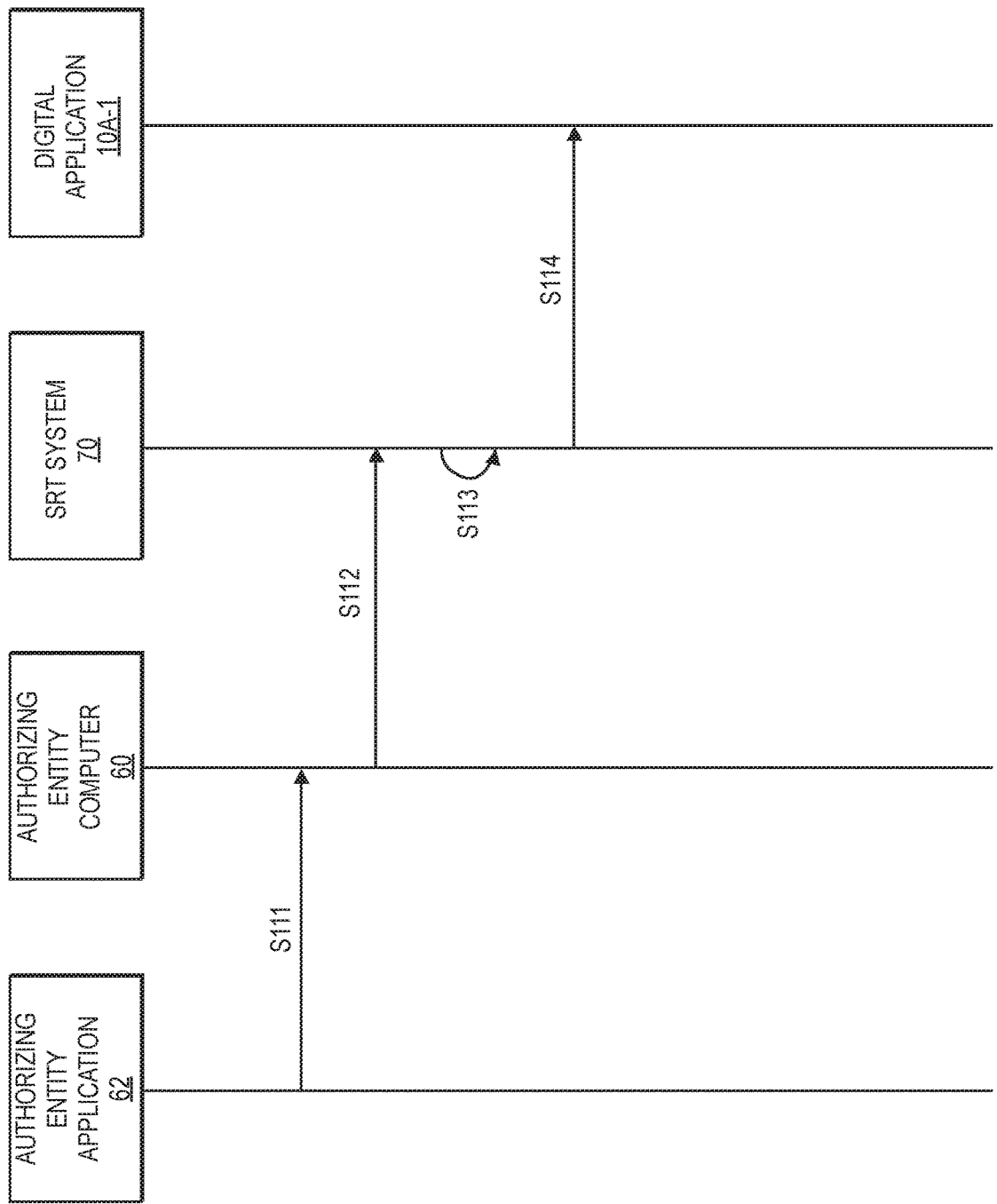
FIG. 2B shows a process for an issuer to link a user's account to an application on a communication device according to the embodiments.

FIG. 2B shows a set up and enablement flow for a user to enable a communication device to initiate an SRT transaction.

In step S111, a user may use an authorizing entity application 62 on the user's communication device (not shown in FIG. 2B) to activate a card or payment account for digital use. A communication can be sent from the authorizing entity application 50 to the authorizing entity computer 50 associated with the authorizing entity application 50. The communication may indicate that a user device (e.g., a payment card associated with an account) be used with a digital application that conducts SRT transactions.

In step S112, the authorizing entity computer 60 pushes enrollment information to the SRT system 70 and binds the enrollment information to a user profile in the SRT system 70. The user profile can be accessible to authorized entities when a transaction is initiated by the user, after a communication device operated by the user scans a machine readable code comprising the SRT unique identifier.

In some embodiments, the authorizing entity computer 60 may publish the user's data to the SRT system 70 to register the data to enable the user's communication device to initiate SRT transactions. This data could include cardholder information such as a unique user ID, token, or credential (such as a PAN), etc.

In step S113, the SRT system 70 links data, such as the card art and the digital card data of the user, to an SRT user profile. The user is then directed by the authorizing entity (e.g., an issuer) to download the digital application 10A-1 onto the user's communication device, and to choose a communication device ID. The communication ID can be used by an access device or other device to automatically recognize the user device during a transaction. It can be used to create an ID token that is used instead of the user's actual data during a transaction. The digital application 10A-1 may act as a terminal to send any relevant information to the SRT system 70 through a dedicated API during a transaction.

In step S114, the user links the digital application 10A-1 on the communication device to the SRT system 70, which may then bind the user profile information in the SRT system 70 to the digital application 10A-1, and the communication device that stores the digital application 10A-1.

Figure 3:
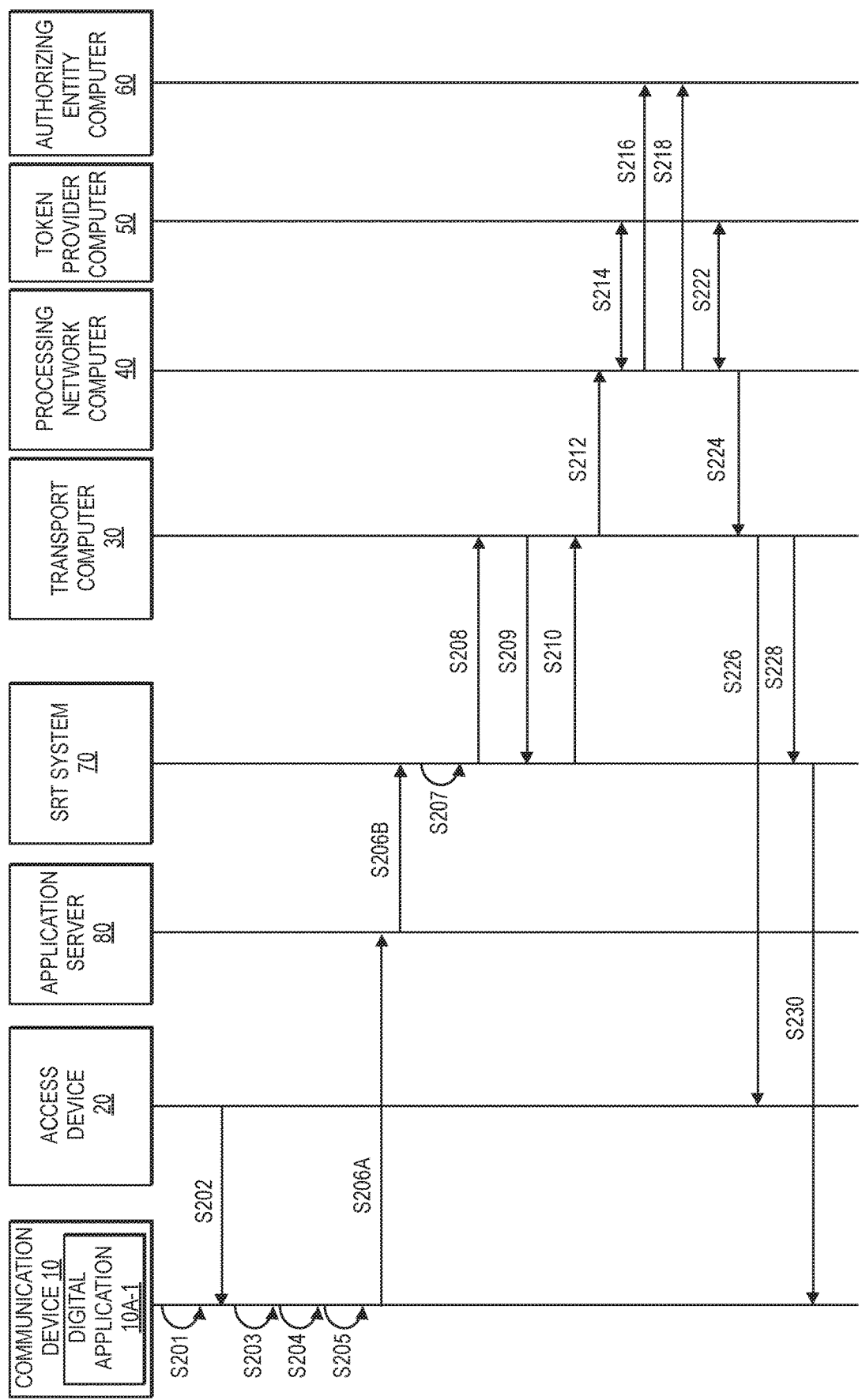
FIG. 3 shows an overview of the transaction flow between a resource provider and a consumer according to the embodiments.

FIG. 3 shows a transaction flow between a user operating a mobile device 80 operating a digital application 10A-1 and a resource provider (e.g., a merchant) operating an access device 20.

In step S201, the user activates a digital application 10A-1 on a communication device 10. The digital application 10A-1 can be a digital payment application. The digital application 10A-1 can activate a camera of the communication device 10 after it has been activated.

In step S202, the access device 20 at the resource provider (e.g., a merchant) presents the user with the SRT unique identifier (or resource provider identifier) via a resource provider application. The SRT unique identifier (or the resource provider identifier) could be provided to the user's communication device 10 by the access device via a displayed machine readable code such as a QR code, an NFC tag, a Bluetooth connection, etc. The user then invokes the digital application 10A-1 to pay via the SRT system 70, and the user then uses the communication device 10 to scan the SRT unique identifier or the QR code encoding the SRT unique identifier provided by the access device 20.

In step S203, the digital application 10A-1 may request that the user validate their identity by performing an authentication process. For example, the user may be asked by the digital application 10A-1 to provide a biometric sample or PIN before an SRT transaction can be conducted. After authenticating the user, the digital application 10A-1 on the communication device 10 can parse the received machine readable code to obtain the SRT unique identifier and other information.

The digital application 10A-1 determines that this is an SRT transaction from the data in the machine readable code or from the characteristics of the SRT unique identifier. The digital application 10A-1 then displays a list of user device indicators of user devices that can be used to conduct the transaction. In some embodiments, the user device indicators may be images of user devices that can be used to conduct the transaction. In some cases, such indicators may be stored in memory on the communication device 10, retrieved from the memory, and then displayed to the user. In other embodiments, such indicators may be automatically retrieved from the SRT system 70 by providing the SRT system 70 with a communication device identifier for the communication device 10, and then displayed to the user.

In step S204, after the one or more user device indicators are displayed or otherwise presented to the user on the communication device 10, the user selects a user device indicator associated with the user device that will be used to conduct the transaction. The selected user device has access data associated with it that is stored at the SRT system 70. That access data will be used to conduct the transaction.

In step S205, the digital application 10A-1 on the communication device 10 can display the information obtained from the machine readable code obtained from the access device 20. Such information can include the resource provider's name, the physical location of the resource provider, the transaction currency that is used in the current transaction, and optionally the SRT unique identifier. The digital application 10A-1 may also optionally prompt the user to enter and/or confirm the transaction amount for the current transaction.

In steps S206A and S206B, upon confirming the transaction, the digital application 10A-1 on the communication device 10 can send a message in the form of a "checkout request" to the SRT system 70 via an API and an application server 80 associated with the digital application 10A-1. The message can comprise resource provider account information, the transaction currency, the transaction amount, and the user's payment information (such as card data and account data) in the form of the access data reference identifier (e.g., a digital card reference identifier) associated with the access data corresponding to the selected user device in step S204.

In step S207, the SRT system 70 processes the data in the message sent in step 206. The SRT system 70 then validates that the resource provider's information is registered in a registration database, and retrieves the transport computer information associated with the resource provider. The SRT system 70 also generates a SRC correlation ID that allows the SRT system 70 to correlate messages corresponding to the current transaction. In some case, the transport computer information can be encoded in the SRT unique identifier, and does not need to be stored in the SRT system 70.

In step S208, the SRT system 70 sends a notification to the transport computer 30 associated with the resource provider's acquirer via a dedicated URL. The SRT system 70 also prepares payload data using information received from the communication device 10 and information stored in the SRT system 70. The SRT system 70 then searches a database in the SRT system, and retrieves a token or a credential associated with the received access data reference identifier from the database. In some embodiments, the SRT system 70 includes a token, a token expiration, and a token cryptogram in the payload data.

In step S209, the transport computer 30 transmits a get payload message to the SRT system 70 via an API to retrieve the payload data that was prepared in step 208.

In step S210, the SRT system 70 sends a payload response message including the payload to the transport computer 30.

In other embodiments, steps S208, S209 and S210 could be condensed into a single transmission where the payload data is sent from the SRT system 70 to the transport computer 30.

In step S212, the transport computer 30 generates an authorization request message comprising the received payload data and sends it to the processing network computer 40. The authorization request message may comprise at least a token, a token cryptogram, an amount of the transaction, and a resource provider identifier.

In step S214, the processing network computer 40 sends the token and the cryptogram to the token provider computer 50 and receives a real credential in return. The token provider computer 50 may validate the cryptogram before providing the real credential (as described above).

In step S216, the processing network computer 40 modifies the authorization request message to include the real credential instead of the token and sends the modified authorization request message to the authorizing entity computer 60. The authorizing entity computer 60 may then decide if the transaction is authorized or not. The authorization may be based upon whether the user has sufficient value and/or if the user or communication device has been sufficiently authenticated.

In step S218, the authorizing entity computer 60 may transmit an authorization response message comprising the transaction approval or denial code, and the real credential, back to the processing network computer 40.

In step S222, the processing network computer 40 can communicate with the token provider computer 50 to exchange the real credential for the token.

In steps S224 and S226, the processing network computer 30 forwards the authorization response message with the token and the approval or decline code to the access device 20 via the transport computer 30.

In steps S228, after the transport computer 30 receives the authorization response message, the transport computer 30 can send a notifications as to the completion of the transaction (e.g., an approved or decline) to the SRT system 70, the application server 80, and the digital application 10A-1 on the communication device 10.

At the end of the day or any other suitable period of time, a clearing and settlement process can occur between the transport computer 30, the processing network computer 40, and the authorizing entity computer 60.

FIG. 4 shows user interfaces demonstrating the experience of a user according to at least some of the embodiments of the disclosure.

Figure 4B:
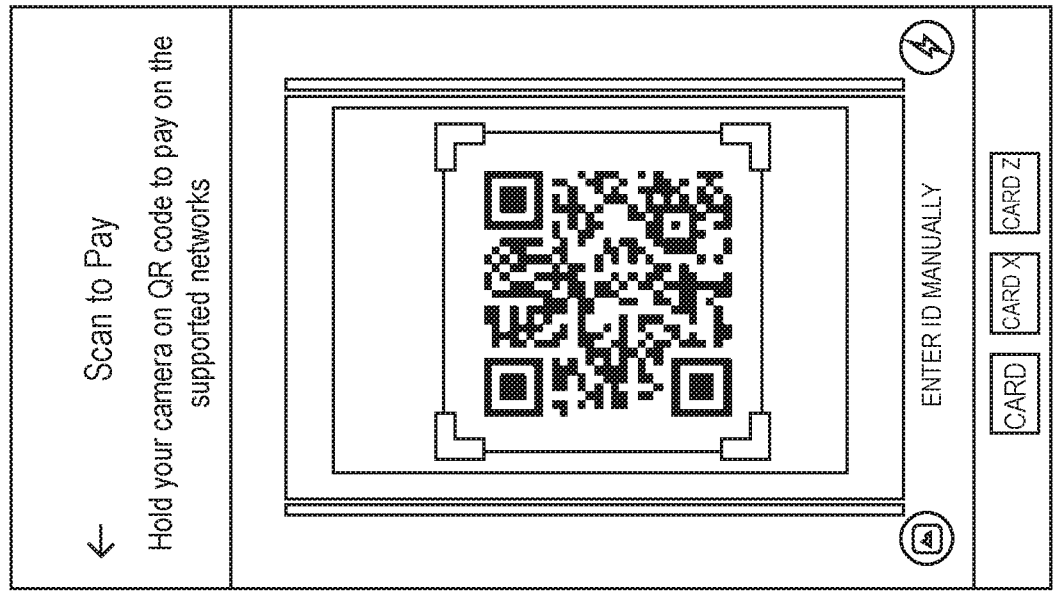
FIGS. 4A-4F shows screenshots of images that a user would view on a mobile device or access device.
Figure 4A:
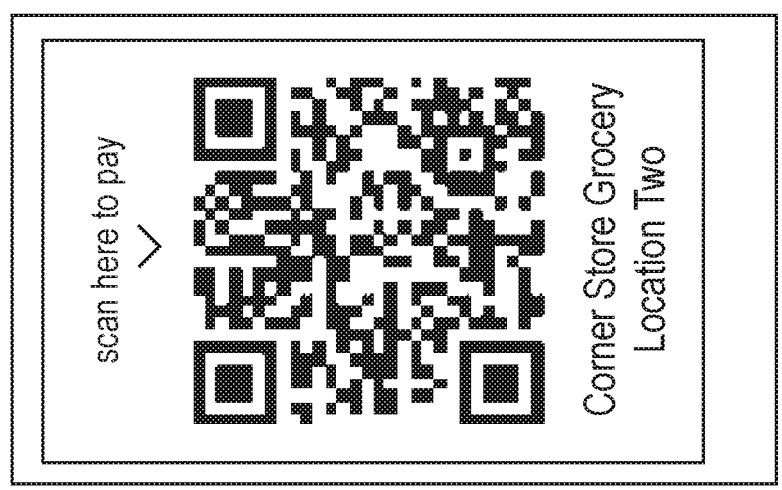

FIG. 4A shows a QR code that may encode an SRT unique identifier and that can be displayed by an access device. The name and the location of the resource provider is also displayed. This can be shown by the access device 20 in step S202 in FIG. 3.

FIG. 4B shows an image of a scanned QR code on a communication device such as the communication device 10 in FIG. 3.

Figures 4C, 4D:
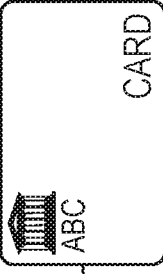

FIG. 4C an image of displayed user device indicators for different user devices held by a user of a communication device.

FIG. 4D shows an image of a selected user device indicator and a field where a user may enter a transaction amount for the current transaction. This image can be part of step S204 as described above with respect to FIG. 3.

Figure 4F:
Figure 4E:
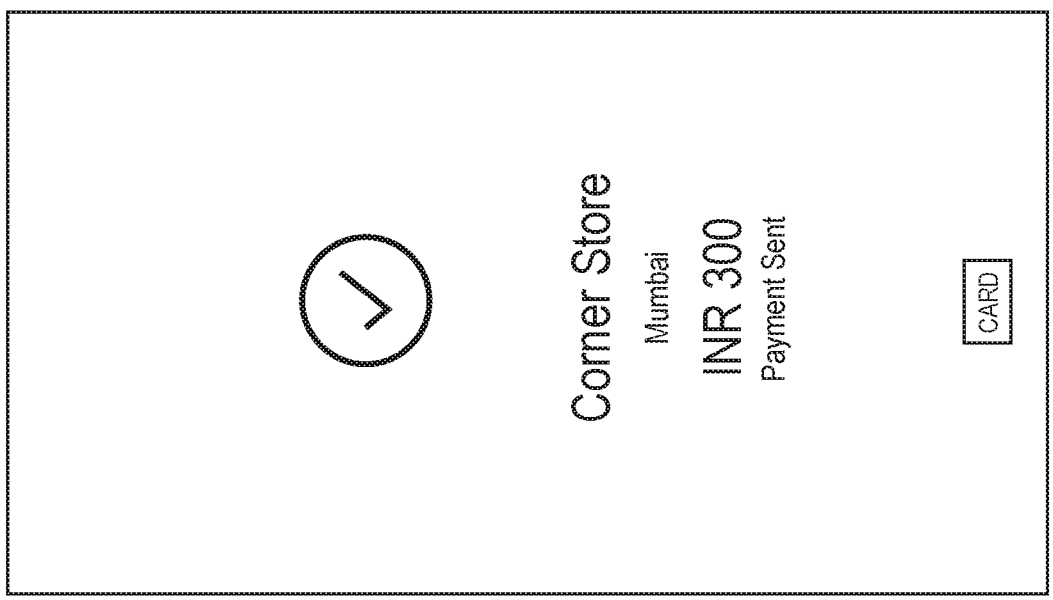

FIG. 4E shows an image of a payment notification displayed on the communication device after the transaction has been processed through an SRT system.

FIG. 4F shows an image of a payment notification displayed on an access device of a resource provider of a transaction that has been processed through an SRT system.

Figure 5:
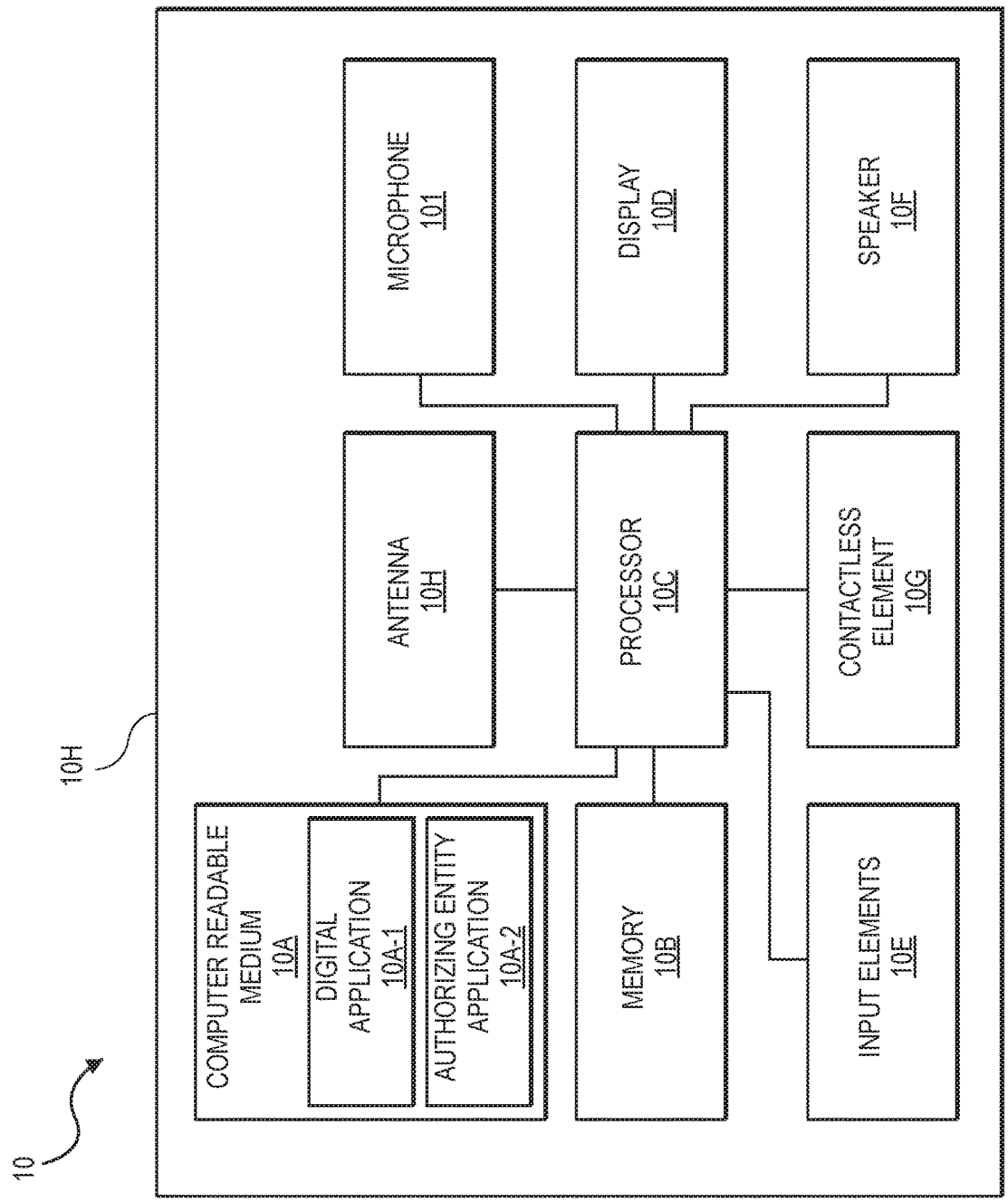
FIG. 5 shows a block diagram of a communication device according to an embodiment.

FIG. 5 shows a block diagram of a mobile device 10 according to an embodiment of the invention. In some embodiments, the mobile device 10 may be a payment device that can be used to make payments or a device which can allow a user to gain access to a location or secure data. The exemplary mobile device 10 may comprise a computer readable medium 106 that can be present within the body 10H of the mobile device 10. The computer readable medium 10A may be in the form of a memory that stores data. In some cases, the memory 10B may also store information such as access data including access data reference identifiers and communication device identifiers. In general, any of this information may be transmitted by the mobile device 10 to another device, using any suitable method, including the use of antenna 10A or contactless element 10G. The body 10H may be in the form a plastic substrate, housing, or other structure.

The computer readable medium 10A may comprise a digital application 10A-1 and an authorizing entity application 10A-2. The digital application 10A-1 may be a digital wallet application, a secure data access application, a secure location access application, etc. The authorizing entity application 10A-2 may be an issuer application in some embodiments. The computer readable medium 10A may comprise code, executable by the processor for implementing a method comprising receiving, by an application on a communication device from an access device, a unique identifier associated with a resource provider in a transaction; transmitting, by the application, a message comprising the unique identifier and an access data reference identifier associated with access data to a remote server computer associated with the application, wherein the remote server computer searches a database for access data using the access data reference identifier, retrieves the access data, and provides the access data to a transport computer which processes the transaction using the access data; and receiving a notification that the transaction is authorized.

In some embodiments, the mobile device 10 may further include a contactless element 10G, which is typically implemented in the form of a semiconductor chip (or other data storage element) with an associated wireless transfer (e.g., data transmission) element, such as an antenna. Contactless element 10G may be coupled to (e.g., embedded within) the mobile device 10 and data or control instructions that are transmitted via a cellular network may be applied to the contactless element 10G by means of a contactless element interface (not shown). Contactless element 10G may be capable of transferring and receiving data using a short range wireless communication capability. As noted above, mobile device 10 may comprise components to both be the interrogator device (e.g. receiving data) and the interrogated device (e.g. sending data). Thus, the mobile device 10 may be capable of communicating and transferring data or control instructions via both cellular network (or any other suitable wireless network—e.g. the Internet or other data network) and short range communications.

The mobile device 10 may also include a processor 100 (e.g., a microprocessor) for processing the functions of the mobile device 10 and a display 10D to allow a consumer to see phone numbers and other information and messages. The mobile device 10 may further include input elements 10E to allow a user to input information into the device, a speaker 10F to allow the user to hear voice communication, music, etc., a microphone 101 to allow the user to transmit their voice through the mobile device 10, and a camera to take pictures. The mobile device 10 may also include an antenna 10A for wireless data transfer (e.g., data transmission).

The memory 20 may be in the form of one or more memory devices (e.g., RAM, EEPROM, ROM chips), using any suitable mode of data storage. In some embodiments, the memory 20 in the mobile device 10 may also include a secure storage area for storing sensitive data such as payment credentials (account numbers, payment tokens, verification values, etc.) and access data. For example, the memory 20 may be part of or may contain a secure element.

Figure 6:
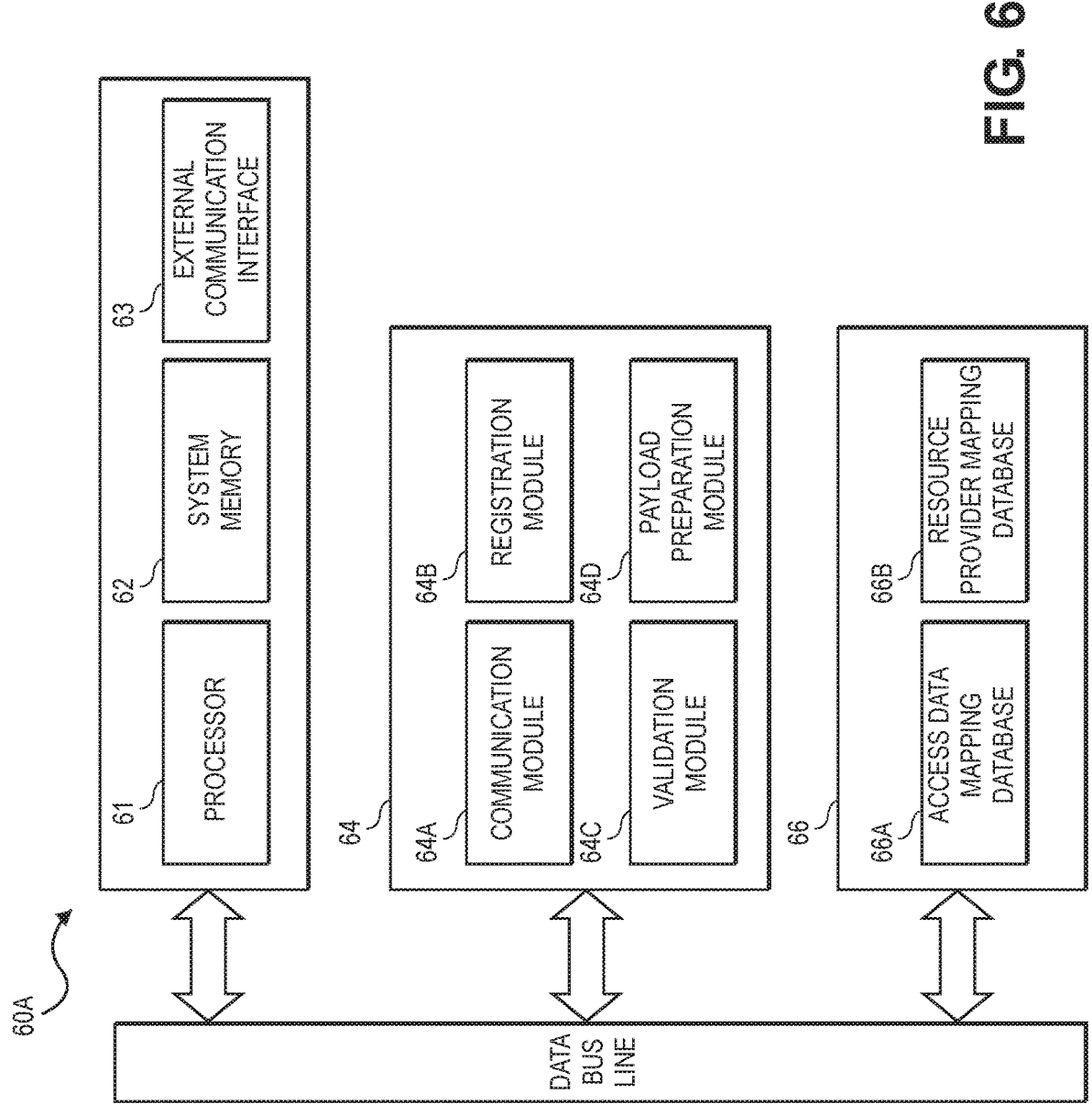
FIG. 6 shows a block diagram of a remote server computer that can be in an SRT system according to an embodiment.

FIG. 6 shows a block diagram of components of a server computer 60A in an SRT system. The server computer 60A may comprise a processor 61, which may be coupled to a system memory 62 and an external communication interface 63. A computer readable medium 64 may also be operatively coupled to the processor 61. The computer readable medium may comprise code, executable by the processor 61, to perform a method including receiving, by a remote server computer, from an application on a communication device in a transaction, a message comprising a unique identifier associated with a resource provider and an access data reference identifier associated with access data; searching a database for access data using the access data reference identifier; retrieving the access data; and providing the access data to a transport computer which processes the transaction using the access data.

The computer readable medium 64 may also comprise a number of software modules including a communication module 64A, a registration module 64B, a validation module 64C, and a payload preparation module 64D.

The communication module 64A may comprise code that causes the processor 61 to generate messages, forward messages, reformat messages, and/or otherwise communicate with other entities.

The registration module 64B may comprise code that causes the processor 61 to handle the registration of resource providers and their devices, user and their communication devices, and transport computer and the entities (e.g., acquirers) that operate those transport computers.

The validation module 64C may comprise code that causes the processor 61 to validate data in messages. For example, the validation module, in conjunction with the processor 61, can analyze data in a message to determine if a resource provider, communication device or digital application is authorized to conduct a current SRT transaction.

The payload preparation module 64D may comprise code that can cause the processor 61 to search one or more databases and retrieve data from those databases to prepare a payload that is to be sent to another entity.

The access data mapping database 66A may map access data (e.g., credentials or tokens) to access data reference identifiers, in user profiles. Communication device identifiers may also be present in the user profiles.

The resource provider mapping database 66B may store data that maps resource provider identifiers to certain entities (e.g., acquirers) that operate transport computers, to registration data (e.g., date and time when resource providers are registered).

Embodiments of the invention have a number of technical improvements. For example, in embodiments of the invention, a resource provider such as a merchant is never in possession of sensitive access data such as a real credential or a token. As such, the sensitive access data is projected from hacking that might occur at resource provider or unscrupulous resource providers who might otherwise steal the sensitive access data. This constitutes an improvement in data security.

Further, because the access data is stored at an SRT system instead of a user's communication device, problems with the access data can be resolved in few steps than would otherwise be the case if the access data was stored on an individual communication device and was provided to many different digital applications. For example, a user may have many different digital applications on their communication device. The user may store sensitive access data such as a token with each of the digital applications. If the access data becomes unusable (e.g., it is expired), the user needs to update each access data instance on each application. However, in embodiments of the invention, the access data is stored in a central location and is accessed with access data reference identifiers. These access data references identifiers can be provided to many different digital applications and their associated application servers. If the access data needs to be changed, it can be done once at the SRT system rather than at each digital application.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
    activating a digital wallet application on a communication device to scan encoded data associated with a resource provider in a transaction, wherein the encoded data comprises a unique identifier associated with the resource provider in the transaction;
    receiving, by the digital wallet application on the communication device from an access device, the unique identifier associated with the resource provider in the transaction;
    receiving a selected user device;
    retrieving an access data reference identifier associated with the selected user device;
    transmitting, by the digital wallet application on the communication device to a remote server computer that is a secure remote transaction (SRT) computer associated with the digital wallet application via a dedicated API, a message comprising the unique identifier and the access data reference identifier associated with the selected user device,
    wherein the remote server computer centrally stores access data comprising account information for a payment account for a plurality of different digital wallet applications on the communication device,
    wherein the remote server computer is configured to update the access data for each of the plurality of different digital wallet applications stored on the communication device based on the message received via the dedicated API by the remote server computer from the digital wallet application, via the access data reference identifier associated with the selected user device,
    wherein the communication device is configured to retrieve access data reference identifiers from the remote server computer,
    wherein the remote server computer is configured to generate a dynamic authentication ID that is sent to a transport computer for encoding into the unique identifier, the transport computer configured to send an authorization request message to a payment processing network computer,
    wherein the dynamic authentication ID is configured to validate the unique identifier during the transaction,
    wherein the unique identifier includes data signed by a private key of a public-private key pair, wherein a public key of the public-private key pair is configured to validate the unique identifier,
    wherein the remote server computer searches a database for access data using the access data reference identifier, retrieves the access data, and provides the access data to the transport computer which processes the transaction using the access data;
    wherein the access data for the plurality of different digital wallet applications on the communication device are configured to be updated in a single instance; and
    receiving a notification via the dedicated API that the transaction is authorized.

2. The method of claim 1, wherein the unique identifier is encoded in a QR code, the access device is an access terminal that is configured to generate authorization request messages.

3. The method of claim 1, wherein the remote server computer is in an SRT system.

4. The method of claim 1, wherein the access data comprises a real credential.

5. The method of claim 1, wherein the access data comprises an access token.

6. The method of claim 1, wherein the transaction is a transaction to access secure data, and the notification comprises the secure data.

7. The method of claim 1, wherein the communication device is a mobile phone comprising a camera and the unique identifier is embedded in a machine readable code.

8. The method of claim 1, wherein after the communication device receives the unique identifier, the communication device displays a plurality of user devices, wherein one of the user devices corresponds to the access data.

9. The method of claim 8, wherein the selected user device corresponds to the access data from a user of the user device.

10. The method of claim 9, wherein the plurality of user devices are a plurality of cards.

11. The method of claim 9, wherein the access data comprises an access token, which is a substitute for a real credential.

12. The method of claim 1, wherein the transport computer generates and transmits an authorization request message comprising the access data to an authorizing entity computer to obtain authorization for the transaction.

13. The method of claim 1, wherein the access data comprises an access token, and wherein the transport computer generates and transmits an authorization request message comprising the access token to the payment processing network computer, which obtains a real credential using the access token and communicates with an authorizing entity computer to obtain authorization for the transaction.

14. A communication device comprising:
a processor; and
a computer readable medium, the computer readable medium comprising code, executable by the processor, to perform a method comprising:
activating a digital wallet application on the communication device to scan encoded data associated with a resource provider in a transaction, wherein the encoded data comprises a unique identifier associated with the resource provider in the transaction;
receiving, by the digital wallet application from an access device, the unique identifier associated with the resource provider in the transaction;
receiving a selected user device;
retrieving an access data reference identifier associated with the selected user device;
transmitting, by the digital wallet application on the communication device to a remote server computer that is a secure remote transaction (SRT) computer associated with the digital wallet application via a dedicated API, a message comprising the unique identifier and the access data reference identifier associated with the selected user device,
wherein the remote server computer centrally stores access data comprising account information for a payment account for a plurality of different digital wallet applications on the communication device,
wherein the remote server computer is configured to update the access data for each of the plurality of different digital wallet applications stored on the communication device based on the message received via the dedicated API by the remote server computer from the digital wallet application, via the access data reference identifier associated with the selected user device,
wherein the communication device is configured to retrieve access data reference identifiers from the remote server computer,
wherein the remote server computer is configured to generate a dynamic authentication ID that is sent to a transport computer for encoding into the unique identifier, the transport computer configured to send an authorization request message to a payment processing network computer,
wherein the dynamic authentication ID is configured to validate the unique identifier during the transaction,
wherein the unique identifier includes data signed by a private key of a public-private key pair, wherein a public key of the public-private key pair is configured to validate the unique identifier,
wherein the remote server computer searches a database for access data using the access data reference identifier, retrieves the access data, and provides the access data to the transport computer which processes the transaction using the access data,
wherein the access data for the plurality of different digital wallet applications on the communication device are configured to be updated in a single instance; and
receiving, via the dedicated API, a notification that the transaction is authorized.

15. The communication device of claim 14, further comprising:
an antenna coupled to the processor; and
a camera coupled to the processor.

16. The communication device of claim 15, wherein the unique identifier is present in a two-dimensional machine readable code and the camera is adapted to scan the two-dimensional machine readable code.

17. A method comprising:
receiving, by a remote server computer that is a secure remote transaction (SRT) computer associated with a digital wallet application, from the digital wallet application on a communication device in a transaction via a dedicated API, a message comprising a unique identifier associated with a resource provider and an access data reference identifier associated with access data of a selected user device,
wherein the remote server computer centrally stores access data comprising account information for a payment account for a plurality of different digital wallet applications on the communication device,
wherein the remote server computer is configured to update the access data for each of the plurality of different digital wallet applications stored on the communication device based on the message received via the dedicated API by the remote server computer from the digital wallet application, via the access data reference identifier associated with the selected user device,
wherein the communication device is configured to retrieve access data reference identifiers from the remote server computer,
wherein the remote server computer is configured to generate a dynamic authentication ID that is sent to a transport computer for encoding into the unique identifier, the transport computer configured to send an authorization request message to a payment processing network computer,
wherein the dynamic authentication ID is configured to validate the unique identifier during the transaction,
wherein the unique identifier includes data signed by a private key of a public-private key pair, wherein a public key of the public-private key pair is configured to validate the unique identifier,
searching a database for access data using the access data reference identifier, wherein the access data for the plurality of different digital wallet applications on the communication device are configured to be updated in a single instance;
retrieving the access data; and
providing the access data to the transport computer which processes the transaction using the access data.

18. The method of claim 17, wherein the access data comprises an access token, which a substitute for a real credential.

19. The method of claim 17, further comprising:
validating, by the remote server computer, the unique identifier, before retrieving the access data.

20. The method of claim 17, further comprising:
generating, by the remote server computer, a correlation ID; and
providing the correlation ID to the transport computer along with the access data.

* * * * *